United States Patent
Edson et al.

(10) Patent No.: US 8,717,777 B2
(45) Date of Patent: May 6, 2014

(54) ELECTROLYTIC CAPACITOR WITH A THIN FILM FUSE

(75) Inventors: Douglas Mark Edson, Kennebunk, ME (US); James Allen Fife, Myrtle Beach, SC (US); Glenn Maurice Vaillancourt, Saco, ME (US); David Allen Wadler, South Berwick, ME (US)

(73) Assignee: AVX Corporation, Myrtle Beach, SC (US)

( * ) Notice: Subject to any disclaimer, the term of this patent is extended or adjusted under 35 U.S.C. 154(b) by 2159 days.

(21) Appl. No.: 11/282,111

(22) Filed: Nov. 17, 2005

(65) Prior Publication Data

US 2007/0109727 A1    May 17, 2007

(51) Int. Cl.
*H05K 5/02*    (2006.01)
*H05K 7/18*    (2006.01)

(52) U.S. Cl.
USPC ........... 361/813; 361/763; 361/765; 361/793; 361/520; 361/523

(58) Field of Classification Search
USPC ......... 361/813, 534, 540, 763–767, 793, 520, 361/523
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,224,656 A | 9/1980 | DeMatos et al. | |
| 4,539,620 A | 9/1985 | Gray | |
| 4,539,623 A | 9/1985 | Irikura et al. | |
| 4,639,836 A | 1/1987 | Crowley, Jr. | |
| 4,660,127 A | 4/1987 | Gunter | |
| 4,757,423 A | 7/1988 | Franklin | |
| 4,763,228 A | 8/1988 | Su | |
| 4,899,258 A | 2/1990 | Gouvernelle | |
| 4,907,131 A | 3/1990 | Neal | |
| 4,945,452 A | 7/1990 | Sturmer et al. | |
| 5,011,067 A | 4/1991 | Foisy | |
| 5,019,457 A | 5/1991 | Nishio | |
| 5,049,979 A | 9/1991 | Hashemi et al. | |
| 5,095,297 A | 3/1992 | Perreault et al. | |
| 5,099,218 A | 3/1992 | Salisbury | |
| 5,099,397 A * | 3/1992 | Edson et al. ................. 361/534 |
| 5,166,656 A | 11/1992 | Badihi et al. | |
| 5,168,434 A | 12/1992 | Kobayashi | |
| 5,177,674 A | 1/1993 | Sugisaki | |
| 5,179,507 A | 1/1993 | Iijima | |
| 5,198,868 A | 3/1993 | Saito et al. | |
| 5,206,798 A | 4/1993 | Sugisaki | |

(Continued)

FOREIGN PATENT DOCUMENTS

JP    6455925    3/1989
JP    1268014   10/1989

OTHER PUBLICATIONS

Disclosure of U.S.; Patent Application Form.

(Continued)

*Primary Examiner* — Tuan D Dinh
(74) *Attorney, Agent, or Firm* — Dority & Manning, P.A.

(57) ABSTRACT

The present technology relates to fused capacitor structures provided with a leadframe design configured to accepting a plurality of selectively placed fuses. The leadframe and fuse configuration enables construction of fused capacitors exhibiting low Equivalent Series Resistance (ESR) and allows construction of a variety of fuse configuration using a single leadframe design.

16 Claims, 2 Drawing Sheets

(56) References Cited

U.S. PATENT DOCUMENTS

| | | | |
|---|---|---|---|
| 5,216,584 A | 6/1993 | Okazaki et al. | |
| 5,224,261 A | 7/1993 | Morrill, Jr. | |
| 5,228,188 A | 7/1993 | Badihi et al. | |
| 5,296,833 A | 3/1994 | Breen et al. | |
| 5,357,399 A | 10/1994 | Salisbury | |
| 5,394,295 A | 2/1995 | Galvagni et al. | |
| 5,469,326 A | 11/1995 | Kanetake | |
| 5,478,965 A | 12/1995 | Hashiba | |
| 5,495,386 A | 2/1996 | Kulkarni | |
| 5,576,927 A | 11/1996 | Sekiguchi | |
| 5,583,740 A | 12/1996 | Fujino | |
| 5,608,602 A * | 3/1997 | Kuriyama | 361/534 |
| 5,629,830 A | 5/1997 | Yamagami et al. | |
| 5,643,432 A | 7/1997 | Qiu | |
| 5,661,628 A | 8/1997 | Yamagami | |
| 5,699,597 A | 12/1997 | Nakamura et al. | |
| 5,716,420 A | 2/1998 | Kuriyama | |
| 5,784,248 A | 7/1998 | Tomiyasu et al. | |
| 5,805,413 A * | 9/1998 | Kurita | 361/534 |
| 5,949,639 A | 9/1999 | Maeda et al. | |
| 6,002,322 A | 12/1999 | Krueger et al. | |
| 6,084,464 A | 7/2000 | Lin | |
| 6,191,936 B1 | 2/2001 | Webber et al. | |
| 6,197,252 B1 | 3/2001 | Bishop et al. | |
| 6,322,912 B1 | 11/2001 | Fife | |
| 6,370,009 B1 | 4/2002 | Fellers et al. | |
| 6,411,498 B2 | 6/2002 | Nakamura | |
| 6,423,104 B1 | 7/2002 | Omori et al. | |
| 6,529,366 B2 | 3/2003 | Nakamura | |
| 6,577,486 B1 | 6/2003 | Nishimiya et al. | |
| 6,613,190 B2 | 9/2003 | Omori et al. | |
| 6,665,172 B1 | 12/2003 | Kim | |
| 6,674,635 B1 | 1/2004 | Fife et al. | |
| 6,724,214 B2 | 4/2004 | Manna et al. | |
| 6,735,074 B2 | 5/2004 | Nakamura et al. | |
| 6,751,085 B1 | 6/2004 | Huntington | |
| 6,864,147 B1 | 3/2005 | Fife et al. | |
| 6,870,727 B2 | 3/2005 | Edson et al. | |
| 6,882,045 B2 | 4/2005 | Massingill et al. | |
| 6,882,520 B2 | 4/2005 | Kamigawa et al. | |
| 7,053,644 B1 | 5/2006 | Lindsey et al. | |
| 7,082,025 B2 | 7/2006 | Tamura | |
| 7,116,548 B2 * | 10/2006 | Satterfield et al. | 361/528 |

OTHER PUBLICATIONS

Article—*Simple synergies boost capacitor reach*, Sally Ward-Foxton, Components in Electronics, Apr. 2006, 2 pages.

Product Information—TBW Series (Tantalum Fused Capacitor), AVX Corporation, 1 page.

Product Information—Accu-Guard® (SMD Thin-Film Fuse), AVX Corporation, 18 pages.

Related U.S. Patent Application Form.

Dvorak et al., U.S. Appl. No. 11/623,165, filed Jan. 15, 2007, Fused Electrolytic Capacitor Assembly.

\* cited by examiner

ELECTROLYTIC CAPACITOR WITH A THIN FILM FUSE

BACKGROUND OF THE INVENTION

Electrolytic capacitors, such as tantalum capacitors, are traditionally known for their high capacitance value and compactness. Typical components of a conventional electrolytic capacitor include a main capacitor body, an anode wire or body, an electrolyte, a cathode and a leadframe all molded together in an encapsulating resin package. The anode wire and leadframe of such capacitors form respective positive and negative electrical connections to the capacitor structure. In certain instances, the conduction path associated with the anode lead incorporates fusible protective aspects in the overall capacitor structure.

A known interest in providing tantalum and other types of electrolytic capacitors with internal protective fuses has been previously addressed. U.S. Pat. No. 5,011,067 (Foisy) entitled "Method For Attaching A Fuse Wire To A Leadframe" discloses a tinned nickel-iron alloy lead frame having a plurality of pairs of extending tab portion positioned in a straight row. A long straight piece of an exothermically alloyable fuse wire, with a core of aluminum coaxially clad with palladium in approximately equal volumes, is held in contact with the plurality of pairs of lead frame tabs. Heat is applied to the fuse strand at two points; namely, on one and the other sides of each pair of tabs initiating progressive alloying in two directions from each heated point. When the progressive alloying and melting of the fuse strand reaches a tab, the tab is heated and heat sinks the fuse strand to stop the progressive alloying and melting. There is simultaneously formed a metallurgical bond between the ends of each remaining elemental fuse strand, respectively, and each of the pair of tabs that are bridged by that remaining elemental strand.

U.S. Pat. No. 4,899,258 (Gouvernelle) entitled "Solid Electrolyte Capacitor With Integral Fuse" discloses a solid electrolyte capacitor body embedded in an electrically insulative block of resin. Output terminals each connected to a respective electrode of the capacitor body project from the block. One output terminal includes a first section fixed to one of the electrodes and a second section electrically insulated from the first section and the capacitor body. A fusible member alone establishes electrical connection between the first and second sections. The fusible member is embedded in a rigid thermally insulative resin which extends between the first and second sections to couple them together mechanically.

U.S. Pat. No. 5,166,656 (Badihi et al.) entitled "Thin film Surface Mount Fuses" discloses fuses having consistent operating characteristics that are fabricated by forming a repeating lithographic fuse element pattern on an insulative substrate, passivating the structure, bonding a protective glass plate over the passivation layer, slicing the assembly so formed, terminating the slices and cutting the slices into individual fuses. Fuses thus manufactured may be of any desired dimensions, including standard and non-standard chip sizes.

U.S. Pat. No. 5,095,297 (Perreault et al.) entitled "Thin Film Fuse Construction" discloses a fuse including a fuse casing, an end cap terminal at an end of the casing, a substrate supporting a thin film fusible element thereon, and a disk component that is located at the end of the casing inside of the end cap terminal and has structure that defines a slot and engages an end of the substrate between opposing portions of the structure.

The prevalent desire to provide fusible protective features has, however, raised other issues including unintended increases in the overall equivalent series resistance (ESR) of the finished devices. In addition, the prior art devices have provided capability for only fixed or single fuse values for the finished devices.

While examples of various aspects and alternative embodiments are known in the field of fused electrolytic capacitors, no one design has emerged that generally encompasses all of the above-referenced and other preferred capacitor characteristics.

SUMMARY OF THE INVENTION

The present subject matter recognizes and addresses several of the foregoing drawbacks and other shortcomings encountered in the prior art of electrolytic capacitor technology. Thus, broadly speaking, one aspect of certain embodiments of the present technology is to provide an improved electrolytic capacitor with fusible features that contribute to a low Equivalent Series Resistance (ESR).

Another aspect of additional embodiments of the present technology is to provide a leadframe for an electrolytic capacitor with improved fuse link accommodating features. Such improved fuse link accommodating features enables certain embodiments of the present technology to provide variations in fuse capacity for various final products produced using the same leadframe.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE FIGURES

A full and enabling disclosure of the present subject matter, including the best mode thereof, directed to one of ordinary skill in the art, is set forth in the specification, which makes reference to the appended figures, in which.

Figure 1A:
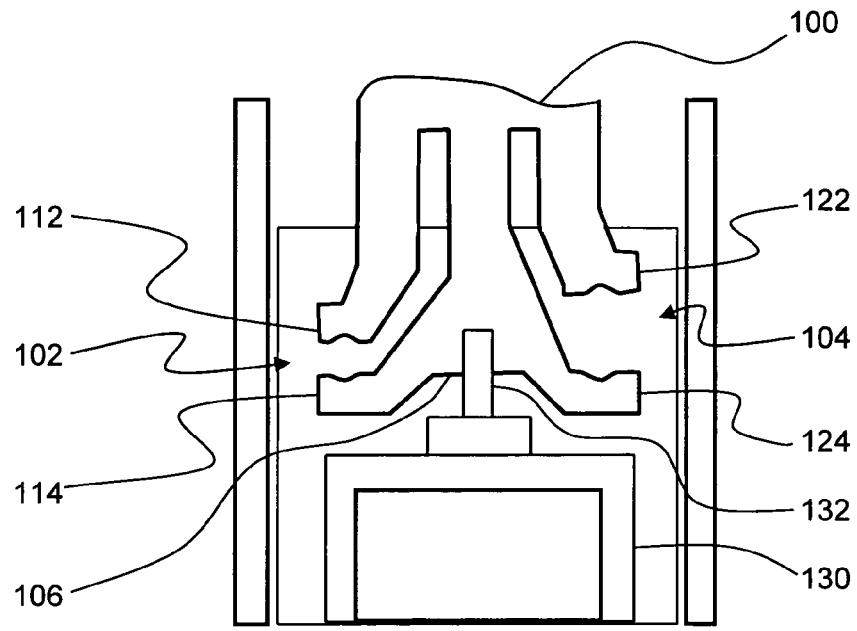
FIG. 1a is a plan view of a portion of a leadframe constructed in accordance with the present technology illustrating an attached electrolytic capacitor prior to enclosure of the capacitor and lead frame portions in a molded device package.

Repeat use of reference characters throughout the present specification and appended drawings is intended to represent same or analogous features or elements of the invention.

DETAILED DESCRIPTION OF REPRESENTATIVE EMBODIMENTS

The present subject matter is particularly concerned with electrolytic capacitor technology. More particularly, the present technology provides an improved electrolytic capacitor with fusible features that contribute to a low Equivalent Series Resistance (ESR).

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject fused electrolytic capacitor. Referring now to the drawings, FIG. 1(a) illustrates a plan view of a portion of a leadframe 100 constructed in accordance with the present technology illustrating an attached electrolytic capacitor 130 prior to enclosure of the electrolytic capacitor 130 and leadframe 100 in a molded device package. Non-limiting exemplary materials for leadframe 100 include copper and copper alloys including, for example, copper alloy 194 and alloy 110, both commercially available from various suppliers. It should be kept in mind that, while the use of a copper or copper alloy leadframe has certain advantages due to its high conductivity, the use of such is not a specific requirement of the present technology.

Exemplary electrolytic capacitors as may be employed with the present technology may generally comprise an anode or anode body, covered by a dielectric layer, substantially coated with a cathode material, all substantially enclosed by conductive layers completing the cathode terminal for the capacitor. Exemplary cathode conductive layer material may include conductive metal oxides. Non-limiting examples include manganese dioxide, or may be a conductive polymer that can be utilized as the conductive layer include, but are not limited to, polypyrroles; polythiophenes, such as poly(3,4-ethylenedioxy thiophene) (PEDT); polyanilines; polyacetylenes; poly-p-phenylenes, and derivatives thereof.

Anode materials may correspond to an anodizable material or valve metal including anodizable metals such as tantalum, niobium, titanium, aluminum, and any alloyed combination of such metals or, anodizable metal nitrides such as tantalum nitride and niobium nitride, and anodizable metal oxides such as niobium monoxide. It should be appreciated that many different variations of reduced niobium monoxides may be suitable for use as an anode material for electrolytic capacitors in accordance with the present technology. One aspect of certain embodiments of the present subject matter may be seen in the bifurcated structure of the leadframe 100 provided to accommodate a plurality of thin film fuses of different physical sizes. As may be seen most easily in FIG. 1(a), leadframe 100 includes a first fuse coupling portion 102 and a second fuse coupling portion 104 configured to accommodate different size fuses. These fuse coupling portions may be viewed as "pockets" within which a thin film fuse may be placed.

First fuse coupling portion 102 (first pocket) of leadframe 100 corresponds to a pair of fuse connection points or terminals 112, 114, that is, a first terminal pair that are more closely spaced from one another than the fuse connection points of second fuse coupling portion 104. Second fuse coupling portion 104 (second pocket) of leadframe 100 corresponds to a pair of fuse connection points or terminals 122, 124, that is a second terminal pair that are more widely spaced from one another than the fuse connection points of first fuse coupling portion 102.

Figure 1B:
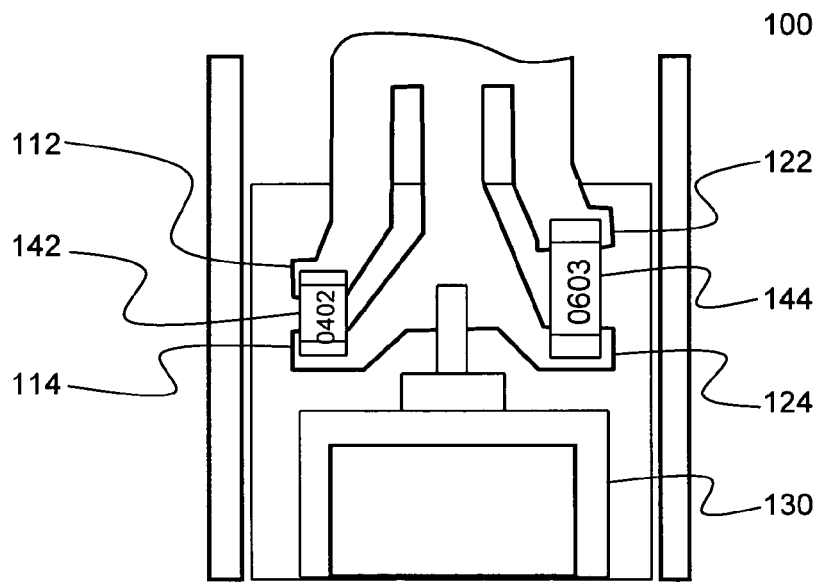
FIG. 1b is a plan view of a portion of a lead frame identical to that illustrated in FIG. 1(a) but having alternate sized fuses positioned for attachment to the frame.

As illustrated in FIG. 1(b), first fuse coupling portion 102 may be sized to accommodate fuses having a "0402" form factor while second fuse coupling portion 104 may be sized to accommodate fuses having a "0603" form factor. It should be strictly understood that such specific form factors are exemplary only and that connection point spacing may be provided to accommodate fuses of other known or yet to be developed form factors.

With further reference to FIG. 1(a), electrolytic capacitor 130 has coupled thereto one end of an anode lead 132 while the other end of anode lead 132 is coupled to leadframe 100 at an area 106 that, in a final production form will be connected electrically in common with fuse termination points 114, 124. It will be appreciated by those familiar with the present technology that, upon final encasement of the capacitor and fuse structure according to the present technology, leadframe 100 will be severed to provide separate coupling points to the then encapsulated components.

With further reference to FIG. 1(b), it will be seen that FIG. 1(b) is identical to FIG. 1(a) except for the illustration of individual fuses 142, 144 positioned at fuse coupling portions 102, 104, respectively. Fuse 142 may be coupled to a first fuse terminal pair corresponding to termination points 112, 114 while fuse 144 may be coupled to a second fuse terminal pair corresponding to fuse termination points 122, 124.

It should be appreciated that in any single configuration of thin film fuse and electrolytic capacitor combination, only a single thin film fuse is to be employed. That is, only one of fuses 142 or 144 is actually put in place. Thus the leadframe provided in accordance with the present technology provides a single configuration of leadframe structure that, none-the-less provides for the placement of differently sized thin film fuses to provide a wider selection of available consumer products with a single leadframe construction.

An additional aspect of the present subject matter resulting from the leadframe construction in accordance with the present technology relates to the equivalent series resistance (ESR) of the electrolytic capacitor and thin film fuse combination. Due to the location of the selected fuse 142 or 144 within the leadframe 100 and, ultimately, in series with electrolytic capacitor 130, the equivalent series resistance of the combination is able to be maintained at a value lower than that readily obtainable by more conventional fused capacitor structures.

Prior tantalum capacitor and conventional fuse combinations, for example, may have an ESR greater than 1,000 milliohms and in some cases greater than 1,500 milliohms. By employing thin film fuses 142 or 144 in combination with the electrolytic capacitor 130 and leadframe 100 construction in accordance with exemplary configurations of the present subject matter, ESR values of less than about 1,000 milliohms and, more particularly, less than about 500 milliohms may be obtained. Such lower ESR values are highly beneficial to the end user of the capacitors.

Yet another aspect to certain embodiments of the preset subject matter concerns the open circuit state of the thin film fuse and capacitor combination. In more conventional designs, it is often necessary to provide fusible leads with protective coatings such as silicone in order to absorb the heat of fuse opening and to prevent the molding material from charring and thereby creating a conductive short circuit path. The thin film fused electrolytic capacitor in accordance with the present subject matter does not require the precaution of silicone or other fire retardants to achieve a reliable open circuit and thus may provide a high open circuit resistance. In an exemplary configuration, open circuit resistance value greater than 10 Megohms, a value high than with silicone protected open wire fused capacitors, may be obtained.

Figure 2:
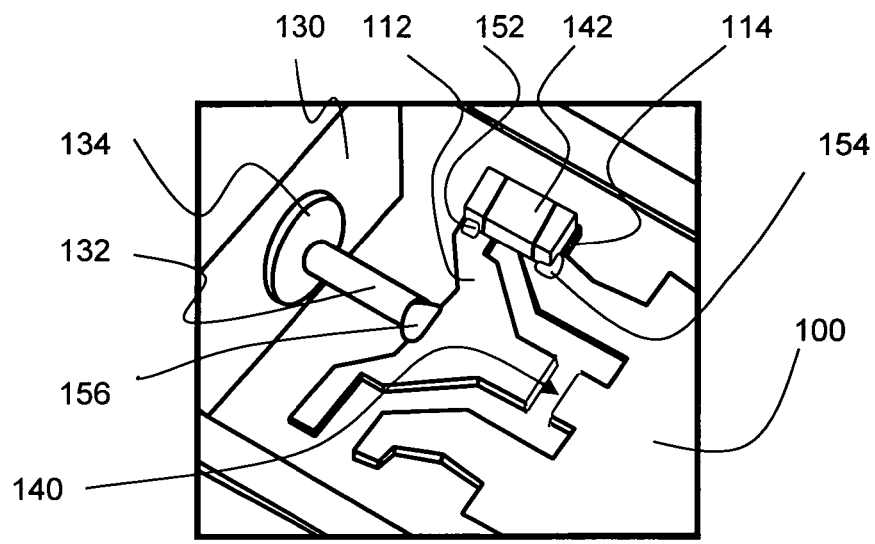
FIG. 2 is a top perspective view representation of a portion of a leadframe with a electrolytic capacitor and a single fuse attached thereto prior to enclosure in a molded device package.

With reference now to FIG. 2, there is illustrated a top perspective view of a portion of a leadframe 100 and associated electrolytic capacitor 130 and thin film fuse 142. Thin film fuse 142 may be secured across one of the terminal pairs, that is, in one of the "pockets" provided for reception of such fuse. In an exemplary configuration, thin film fuse 142 may be secured within the pocket created by fuse termination points 112, 114 by soldering as at 152, 154. Alternative methodologies for securing thin film fuse 142 to fuse termination points 112, 114 including welding, soldering using Sn/Pb alloys, soldering using tin (Sn) and through the use of conductive pastes and epoxy may also be employed.

Electrolytic capacitor 130 may be coupled to leadframe 110 by way of one end of anode wire 132 and solder point 156. The other end of anode wire 132 is connected to anode 134 of the electrolytic capacitor 130. As with the thin film fuse 142, alternative methodologies for securing the anode wire 132 to leadframe 100 and electrolytic capacitor 130 may be employed.

It should be appreciated that while the portions of the foregoing have made reference to electrolytic capacitors and, in particular to tantalum capacitors, such reference is exemplary only as other material may be readily employed. Non-limiting examples include niobium monoxide and niobium nitride as an alternative to tantalum as well as tantalum nitride as an anode material for the capacitors.

Additionally illustrated in FIG. 2 is a cutout portion 140 in the capacitor anode connecting portion of leadframe 100. Prior to encapsulation of the assembled fuse and capacitor structure, cutout 140, is provided to further ensure that a current path is present through the capacitor only by way of the installed fuse.

Figure 3:
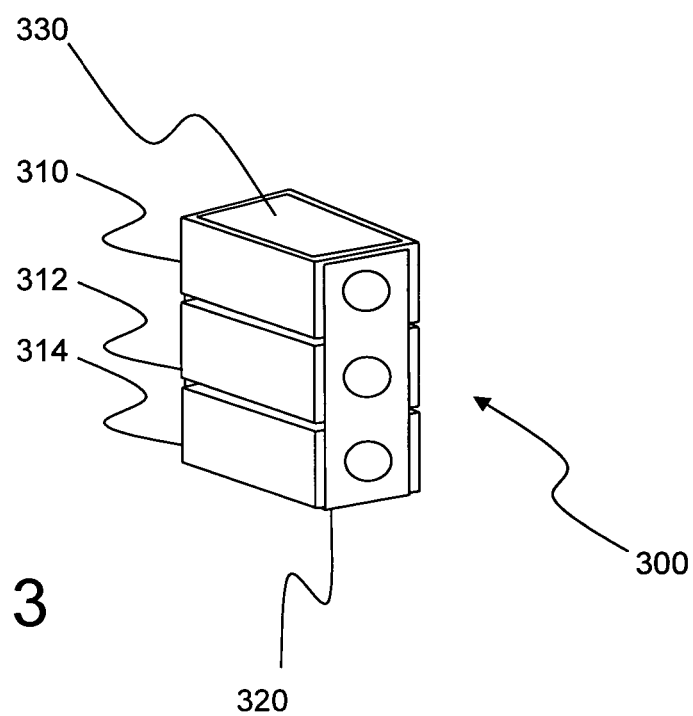
FIG. 3 is a front perspective view representation of a multiple fused capacitor assembly.

With reference now to FIG. 3, an assembly of fused electrolytic capacitors constructed in accordance with the present technology will be described. As illustrated in FIG. 3, a high capacitance valued structure may be obtained by parallel connection of a plurality of fused electrolytic capacitors constructed in accordance with the present subject matter.

In an exemplary configuration, a group 300 of three fused electrolytic capacitors 310, 312, 314 may be coupled together in parallel by way of conductive end termination 320 and top termination 330 to provide an equivalent high valued component. Unseen rear and bottom terminations similar to the conductive end and top terminations provide a second connection point to the parallel connected capacitors.

Through predetermined selection of individual fused electrolytic capacitor components including selection of individual or grouped capacitor and fuse values, composite fused capacitor components with a significant range of combinational values may be obtained while, at the same time, employing but a single leadframe structure in the basic fused capacitor unit.

In an exemplary construction, individual three capacitor modules may be assembled and tested and then combined with other such modules to produce a larger capacitance module. Other combinations of numbers of individual fused capacitors in a module as well as total number of modules to be combined into a larger module are envisioned.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A device comprising:
a leadframe comprising a capacitor anode connection portion, a first fuse coupling portion, and a second fuse coupling portion, wherein said first fuse coupling portion is defined by first spaced apart terminals and said second fuse coupling portion is defined by second spaced apart terminals;
a fuse connected to said first spaced apart terminals and positioned in said first coupling portion; and
a capacitor comprising an anode lead, wherein said anode lead is connected to said capacitor anode connection portion.

2. The device of claim 1, wherein said capacitor is an electrolytic capacitor.

3. The device of claim 1, wherein said capacitor has an anode, wherein the anode includes tantalum.

4. The device of claim 1, wherein said capacitor has an anode, wherein the anode includes niobium oxide.

5. The device of claim 1, wherein said fuse comprises a thin film fuse.

6. The device of claim 1, wherein the device has an equivalent series resistance of less than about 1,000 milliohms.

7. The device of claim 1, wherein the device has an equivalent series resistance of less than about 500 milliohms.

8. The device of claim 1, wherein the capacitor contains a cathode that includes a conductive polymer.

9. The device of claim 1, wherein said second coupling fuse portion is configured to receive an additional fuse having a different form factor than said fuse positioned in said first coupling portion.

10. The device of claim 1, wherein the distance between said first spaced apart terminals is different than the distance between said second spaced apart terminations.

11. The device of claim 1, wherein the leadframe is bifurcated so that said first coupling portion and second coupling portion are positioned on opposing sides of said capacitor anode connection portion.

12. The device of claim 1, wherein the capacitor contains a cathode that includes manganese dioxide.

13. The device of claim 1, wherein the leadframe comprises copper or an alloy thereof.

14. The device of claim 1, wherein the fuse is connected to said first terminals by a material that comprises solder, tin, welding material, conductive paste, or a combination thereof.

15. The device of claim 1, wherein the leadframe further comprises a cutout in the capacitor anode connecting portion so that a current path is present through the capacitor only by way of the fuse.

16. The device of claim 8, wherein the conductive polymer includes a polypyrrole, polythiophene, polyaniline, polyacetylene, poly-p-phenylene, a derivative thereof, a combination of the foregoing.

\* \* \* \* \*